United States Patent
Mudalegundi

(10) Patent No.: US 9,003,036 B1
(45) Date of Patent: Apr. 7, 2015

(54) HTTP HEADER CONTENT-LENGTH INFORMATION

(75) Inventor: Vijayanarayana Gopal Mudalegundi, Cumming, GA (US)

(73) Assignee: Cellco Partnership, Basking Ridge, NJ (US)

( * ) Notice: Subject to any disclaimer, the term of this patent is extended or adjusted under 35 U.S.C. 154(b) by 1203 days.

(21) Appl. No.: 12/910,402

(22) Filed: Oct. 22, 2010

(51) Int. Cl.
*G06F 15/173* (2006.01)
*G06F 17/30* (2006.01)

(52) U.S. Cl.
CPC ............................... *G06F 17/30283* (2013.01)

(58) Field of Classification Search
USPC ........ 709/217, 238; 726/12; 705/51; 719/315
See application file for complete search history.

(56) References Cited

U.S. PATENT DOCUMENTS

| | | | |
|---|---|---|---|
| 7,003,799 B2* | 2/2006 | Jorgenson | 726/12 |
| 2001/0056414 A1* | 12/2001 | Christal et al. | 707/1 |
| 2007/0136469 A1* | 6/2007 | Nusbickel | 709/226 |
| 2009/0064185 A1* | 3/2009 | Araujo | 719/315 |
| 2009/0144444 A1* | 6/2009 | Chauffour et al. | 709/238 |

* cited by examiner

*Primary Examiner* — Kyung H Shin

(57) ABSTRACT

The instant application describes a method for enabling manipulation of a HTTP header of content that is being downloaded through a datapower to include content-length information. The method includes steps of receiving, from a mobile device and at a mobile service provider network, a request for downloading content over a wireless network; forwarding the request to a datapower, which acquires the content from a server and removes content-length information from the content; enabling the datapower to recreate the content-length information of the downloaded content and repopulate the HTTP header of downloaded content with the content-length information; and sending the downloaded content to the mobile device.

15 Claims, 5 Drawing Sheets

US 9,003,036 B1

HTTP HEADER CONTENT-LENGTH INFORMATION

TECHNICAL FIELD

The present subject matter relates to techniques and equipments to enable manipulation of a HTTP header of downloaded content to include content-length information of the downloaded content in a mobile communication.

BACKGROUND

The mobile service provider network supports many applications that a customer can access using their cell phone. These applications allow the customer to check their account balance, make payments, change rate plans and many more. In addition to applications, the mobile service provider network also has an infrastructure that allows the customer to download files to his cell phone. These files could be music, video, or firmware updates. The customer accesses these applications and file downloads through the public Internet.

When a client connects directly to a web server to download a file, the web server will send back to the client the length of the file before the server starts downloading the file. The file length is contained in an HTTP header variable called "Content-length". If the client program knows the length of the file that is being downloaded, it can then calculate what percentage of the file has been downloaded so far. This information can be displayed to the user in a progress bar, for example.

The network of a mobile service provider such as, for example, Verizon Wireless™, allows customers to download many different files to their mobile device through a routing server named datapower. The datapower is a product division within IBM that produces a network device that specializes in XML transformations, routing and security. The datapower 35 is one brand from the IBM product division. The main function of the datapower in the mobile service provider network of our example is for URI routing. The reason that routing is necessary is because different groups of machines handle different types of requests.

The problem is that datapower, which receives the requests for file download from the customer and replies back to such requests from the customer, filters out the HTTP header "Content-Length". This means that the client device cannot display progress bars. Not having the progress bars displayed is a problem for the customer. The files being downloaded can be over 50 mega bytes in size. Also, the speed of a wireless Internet connection can very based on the strength of signal or amount of traffic. These two factors make the task of downloading a file take from several minutes to several hours. Therefore, it is important for the customer to see that progress is being made.

Furthermore, some mobile devices, such as, for example, Motorola™ "Calgary" device require the HTTP header file content-length information passed to it when it downloads a music or video file. Since video and music files can be quite large, these mobile devices require first determining if they have enough space to download a file before allowing the client to get the file. In the event the file length is not passed to the device, the device displays to the user an error message "Unknown file size error" and does not let the user download the file.

Therefore, there is a need to solve the problem of datapower filtering out the HTTP header "Content-Length" as this would cause wireless devices to not be able to display a progress bar when downloading a file and may prevent the download music or video files to some types of mobile devices.

SUMMARY

The disclosed examples solve the problem of the datapower filtering out the HTTP header "Content-Length," which naturally causes wireless devices to not be able to display a progress bar when downloading a file and would prevent the download music or video files in some wireless devices. The examples work around the filtering to enable the successful downloading of such files.

One example relates to a method for enabling manipulation of a HTTP header of content that is being downloaded through a routing server to include content-length information. The method includes steps of receiving, from a mobile device and at a mobile service provider network, a request for downloading content over a wireless network; forwarding the request to a routing server, which acquires the content from a content server and removes content-length information from a HTTP header of the acquired content; enabling the routing server to recreate the content-length information of the acquired content and repopulate the HTTP header of the acquired content with the content-length information; and sending the content with the HTTP header containing the content-length information, through the mobile service provider network to the mobile device.

The above general aspects may include one or more of the following features. The routing server may include an IBM datapower. Forwarding the request to the IBM datapower may include forwarding the request to the IBM datapower configured for Uniform Resource Indicator ("URI") routing. Forwarding the request to the IBM datapower may include forwarding the request to the IBM datapower having a load balancer group configured to distribute workload evenly across two or more content servers. The content server may be a server that includes various content for download. Enabling the routing server to recreate the content-length information of the downloaded content may include: creating a file containing file names and file lengths for files accessed by a user of the mobile device over the mobile service provider network for downloading; downloading the file to the routing server; identifying a file name included in the request; and referencing the file to identify a file size corresponding to the identified file name in the request.

Enabling the routing server to repopulate the HTTP header of downloaded content with the content-length information may include repopulating the HTTP header of downloaded content with the identified file size. Forwarding the request to the routing server may include forwarding the request to a gateway including a set of rules for handling incoming requests coming to the routing server from the mobile device and a set of rules for handling replies coming back to the routing server from the content server. Each rule may include a match condition that must be met to be activated, the method further comprising steps of: upon acquiring the content from the content server a step of referencing the set of rules for handling replies coming back to the routing server from the content server to identify a match; and inserting the content-length information into the HTTP header based on the identified rule. Sending the content to the mobile device may include streaming the content from the content server through the routing server to the mobile device.

In another aspect, the instant application describes a routing server for enabling manipulation of a HTTP header of content that is being downloaded through the routing server to include content-length information, the routing server comprising: at least one processing device; and at least one memory storing executable instructions for causing the at least one processing device to: receive, from a mobile device via a mobile service provider network, a request for downloading content over a wireless network; acquire the content from a content server; remove content-length information from a HTTP header of the acquired content; recreate the content-length information of the acquired content; repopulate the HTTP header of the acquired content with the content-length information; and send, to the mobile device and through the mobile device provider network, the acquired content with the HTTP header containing the content-length information.

The above general aspect may include one or more of the following features. The content server may be a server that includes various content for download. The routing server may include an IBM datapower. The at least one memory may store executable instructions for causing the at least one processing device to perform Uniform Resource Indicator ("URI") routing. The at least one memory further may store executable instructions for causing the at least one processing device to distribute workload evenly across two or more content servers.

To recreate the content-length information of the acquired content, the at least one memory may store executable instructions for causing the processing device to: reference a file containing file names and file lengths for files accessed by a user of the mobile device over the mobile service provider network for downloading; identify a file name included in the request; and identify a file size corresponding to the identified file name in the request by referencing the file. To repopulate the HTTP header of the acquired content with the content-length information, the at least one memory may store executable instructions for causing the processing device to repopulate the HTTP header of downloaded content with the identified file size. The at least one memory may store a set of rules for handling incoming requests coming to the routing server from the mobile device and a set of rules for handling replies coming back to the routing server from the server.

Each rule may include a match condition that must be met to be activated; and the at least one memory may store executable instructions for causing the processing device to: reference the set of rules for handling replies coming back to the routing server from the content server to identify a match; and insert the content-length information into the HTTP header based on the identified rule. To acquire the content from the content sever and to send the content to the mobile device, the at least one memory may store executable instructions for causing the processing device to acquire and send the content in a streaming manner.

Implementations of the described techniques may include hardware, a method or process, or computer software on a computer-accessible medium.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

The details of one or more implementations are set forth in the accompanying drawings and the description below. Other features will be apparent from the description and drawings, and from the claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods, systems and programming disclosed herein enable manipulation of a HTTP header of content that is being downloaded through a datapower to include content-length information. As noted above, the datapower receives a request for content, acquires the content, and sends the requested content back to the customer. However, during this process, the datapower filters out the content-length information from the content that is being sent to the customer. The various methods, systems and programming disclosed herein enable the content-length information to be reinserted back into the reply sent to the customer. In one example, this is done by creating a file that contains file names and file lengths. Then when a file is downloaded through datapower, datapower will look up the file length from the file and then inject this value into the HTTP header. This solution provides a way to recreate and populate the value for the HTTP Header "Content-Length" that datapower filters out.

The benefits of this solution, for example, may include one or more of the following. The client program is able to display the amount of progress that is being made when downloading a large file. Since downloading large files on a wireless Internet connection can take several minutes, it is important the customer be able to track the amount of progress. This solution also allows for Motorola™ device "Calgary" to be able to download music and video files. Without this solution, a mobile service provider may not be able to offer this device to it customers.

The mobile service provider network may support many applications that a customer can access using their cell phone. These applications allow the customer to, among other things, check their account balance, make payments, and change rate plans. In addition and as noted above, the mobile service provider also has an infrastructure that allows the customer to download files to his/her cell phone. These files may include music, video, or firmware updates.

Figure 1:
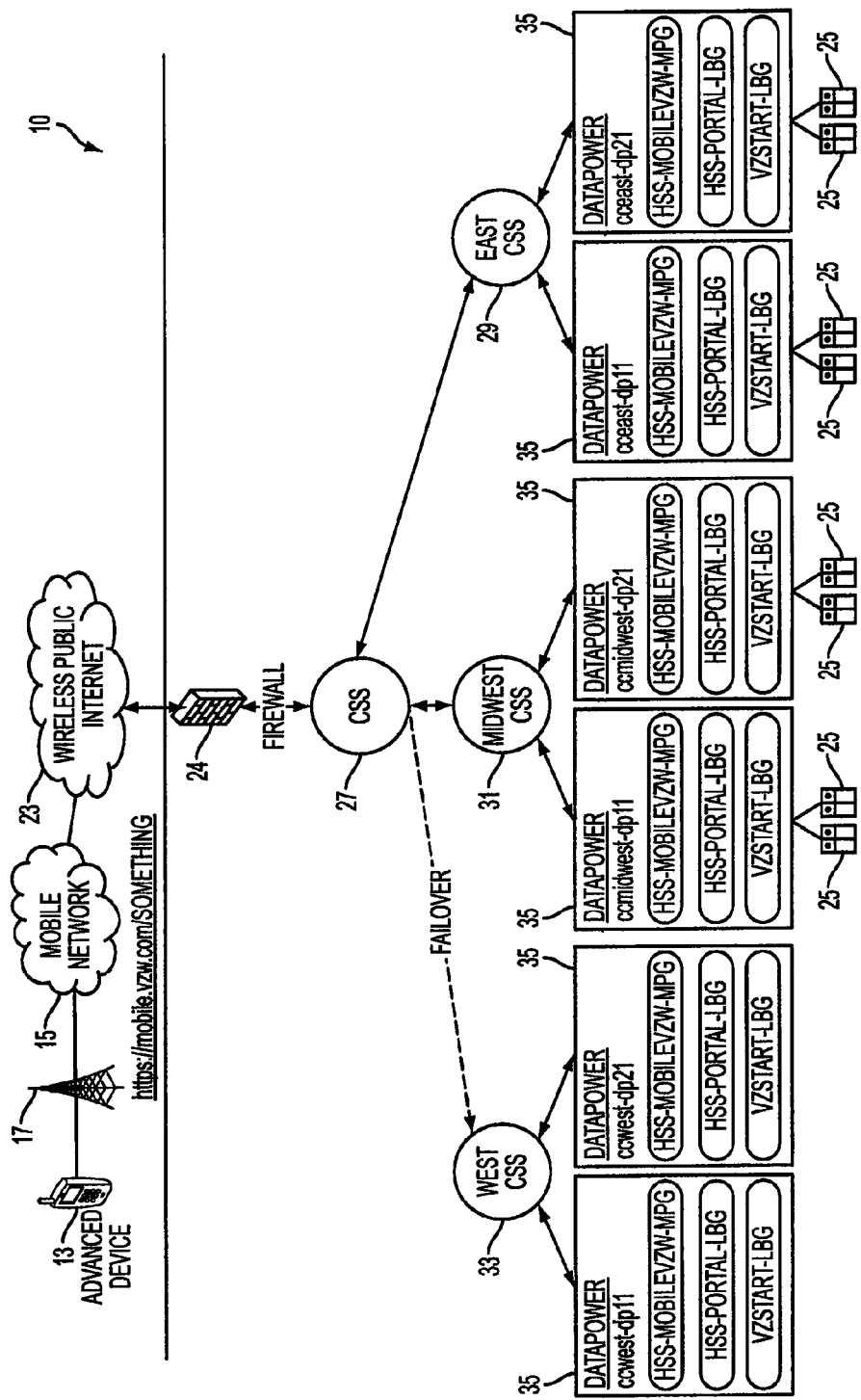
FIG. 1 is a block diagram, high level, system and flow chart diagram illustrating an example of a procedure for downloading content over a mobile service provider network.

FIG. 1 is a block diagram, high level, system and flow chart diagram 10 illustrating an example of a procedure for downloading content over mobile service provider network (e.g., Verizon Wireless™). The example shows simply a mobile device 13 as well as a mobile communication network 15. The mobile device 13 is an example of a mobile device that may be used for downloading content through mobile communication network 15. The network 15 provides mobile wireless communications services to the mobile device 13 as well as to other mobile devices (not shown), for example, via a base station (BS) 17 one of which is shown in the drawing for convenience. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile device 13 may be capable of voice telephone communications through the network 15. The mobile device 13 may also be capable of data communications through the particular type of network 15 (and the users thereof typically will have subscribed to data service through the network).

The network 15 allows the user of the mobile device 13 (and other mobile stations not shown) to initiate and receive telephone calls. The network 15 typically offers a variety of data services via the Internet 23, such as downloads, web browsing, email, etc. By way of example, the drawing shows servers 25 connected to the Internet 23, which as discussed more later, are servers containing content requested by the mobile device 13 for downloading. The data services for the mobile device 13 via the Internet 23 may be with devices like a server 25 as well as with a variety of other types of devices or systems capable of data communications through various interconnected networks. The server 25 is capable of providing content to mobile device 13 through mobile network 15 and Internet 23.

Mobile devices 13 can take the form of portable handsets, smart-phones or personal digital assistants, although they may be implemented in other form factors. Program applications, including an application to assist in content downloads via the Internet can be configured to execute on many different types of mobile stations. For example, a mobile device application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 15 can be implemented by a number of interconnected networks. Hence, the overall network 15 may include a number of radio access networks (RANs), as well as regional ground networks interconnecting a number of RANs and a wide area network (WAN) interconnecting the regional ground networks to core network elements. A regional portion of the network, such as that serving mobile device 13, can include one or more RANs and a regional circuit and/or packet switched network and associated signaling network facilities.

Physical elements of a RAN operated by one of the mobile service providers or carriers, include a number of base stations represented in the example by BS 17. Although not separately shown, such BS 17 can include a base transceiver system (BTS,) which can communicate via an antennae system at the site of base station and over the airlink with one or more of the mobile stations (e.g., mobile device 13), when the mobile devices are within range. Each base station can include a BTS coupled to several antennae mounted on a radio tower within a coverage area often referred to as a "cell." The BTS is the part of the radio network that sends and receives RF signals to/from the mobile stations that are served by the BS 17.

The radio access networks can also include a traffic network represented generally by the cloud at 15, which carries the user communications and data for the mobile device 13 between BS 17 and other elements with or through which the mobile devices communicate. The network can also include other elements that support functionality other than data services, such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 15 and other networks (e.g., the public switched telephone network (PSTN) and the Internet) either directly or indirectly.

A mobile device 13 communicates over the air with BS 17 and through the traffic network 15 for various voice and data communications, e.g. through the Internet 23 with a server 25. Content downloading is a data service, therefore further discussion will focus on data communications. The mobile device 13 accesses the mobile communications network 15 by using an Universal Resource Locator ("URL") as a content request. The URL starts with, for example, https://mobile.vzw.com. The actual URL the customer uses will be longer. For example, the actual URL could be https://mobile.vzw.com/SelfServeRichClient. The URL consists of two parts. The first part, mobile.vzw.com in our example, is the hostname. The second part after the hostname is called an Universal Resource Indicator ("URI"). The hostname part tells the Internet that the request needs to be sent to the content provider. The URI tells content provider how to route the request. In the illustrated example, the mobile network service provider is also the content provider. However, one of ordinary skill recognizes that the content provider can be different from the mobile network provider.

In the example shown in FIG. 1, the client of mobile device 13 request is routed through networks 15, 23 and firewall 24 to a Global Content Services Switch ("CSS") 27, which based on the location of the user forwards the request to one of East CSS 29 or Midwest CSS 31. The Global CSS 27 offers a useful level of performance, resource management, network connectivity, system and session reliability, integrated SSL acceleration, and robust load balancing functionality within a compact, modular chassis. If the client's location is in the East, then his request is sent to the East CSS 29, otherwise the request is sent to the Midwest CSS 31. The West CSS 33 is used for failover and is not used unless there is an outage with either the Midwest or East datacenters. The East CSS 29 and Midwest CSS 31 then divide the traffic to two different datapower 35. Thus, a request coming to mobile.vzw.com will be sent to a datapower device 35. The datapower is a product division within IBM that produces a network device that specializes in XML transformations, routing and security. The datapower XI50 is one brand from the IBM product division.

The datapower is a device that has many functions including routing, security, data verification, and more. The datapower also allows the creating of objects called "load balancer groups." A load balancer group allows for the distribution of workload evenly across two or more servers 25. There are two load balancer groups shown, one called "HSS-Portal" and one called "VZSTART-LBG." If datapower sends a group of transactions to load balancer HSS-Portal, then half of the transactions will be sent to one of the servers 25 and the other server 25. Similarly, load balancer VZSTART-LBG divides the transactions between another two servers (not shown). The main function of the datapower in the mobile service provider network of our example is for URI routing. The reason that routing is necessary is because different groups of machines handle different types of requests.

Here is one example of how the routing inside datapower is used at the mobile service provider network. If the URI contains '/wps/portal/', then the request is forwarded to load balance group HSS-PORTAL-LBG. The load balancer HSS-PORTAL-LBG divides the traffic between the two servers 25. If the URI contains 'vzstart,' then the request is forwarded to load balancer group VZSTART-LBG. The load balancer VZSTART-LBG divides the traffic between another two servers (not shown). Although in FIG. 1 two load-balancer groups are shown, the datapower may include more load balancer groups. Each load balancer group may distribute traffic to a different group of servers. The datapower will route each request to the appropriate load balancer group based on the URI.

Incoming download requests coming to the content provider system from customers' devices go through a datapower 35. As noted above, the datapower 35 filters out the content length of the file thus causing the device not to know the length of the file being downloaded. This prevents the device from telling the customer how much progress has it made downloading the file. Also, some devices now require the file length so this limitation has caused these new devices to not work on the mobile service provider network.

As noted, above the present techniques enable datapower 35 to manipulate the HTTP header and inject the HTTP Header Content-Length back into the reply sent back to the customer. This is done by creating a file that contains file names and file lengths. Then, when a file is downloaded through datapower, datapower will look up the file length from the file and then inject this value into the HTTP header. This solution is unique since it provides a way to recreate and populate the value for the HTTP Header "Content-Length" that datapower filters out. The benefits to the mobile service provider are several. First, this solution allows the client program to display the amount of progress that is being made when downloading a large file. Since downloading large files on a wireless Internet connection can take several minutes, it is important the customer be able to track the amount of progress. Second, this also allows for Motorola™ device "Calgary" to be able to download music and video files. Without this solution, the mobile service provider may not be able to offer this device to it customers.

Figure 2:
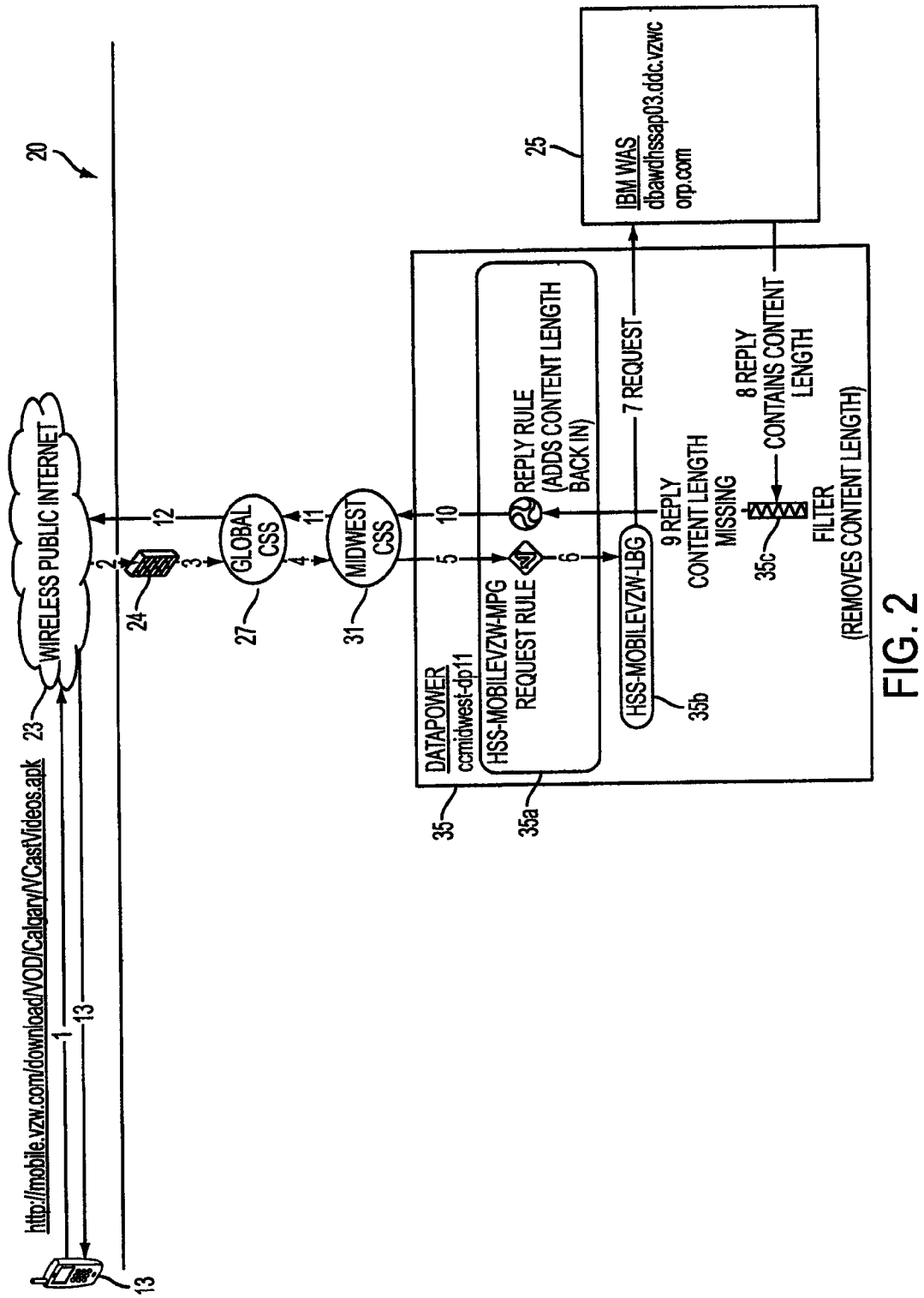
FIG. 2 illustrates an exemplary process for downloading content over a mobile service provider network diagram.

FIG. 2 illustrates a process for downloading files. The diagram includes a simplified version of network 15 shown in FIG. 1 in that some of the elements such as, for example, mobile network 15, base station 17 and East CSS 29 are not shown for the sake of brevity. However, the simplified diagram also includes the signal flow of the exemplary process 20. In the example, the mobile device 13 will send an URL to the public Internet 23 (Step 1) and the request is then routed to the firewall 24 (Step 2) and Global CSS 27 of the mobile service provider network (Step 3). In keeping with the previous example, the request is for downloading content over the wireless network. Depending on the customer's location, the request will be forwarded to an appropriate CSS. In this scenario, the request is forwarded to Midwest CSS 31 (Step 4). The Midwest CSS 31 forwards the request to datapower 35 (Step 5).

The datapower 35 includes a datapower multiple protocol gateway 35a. The Midwest CSS 31 passes the request to the datapower multiple protocol gateway 35a. The datapower multiple protocol gateway 35a is configured to have rules that contain code to handle a message coming to datapower.

Figure 3:
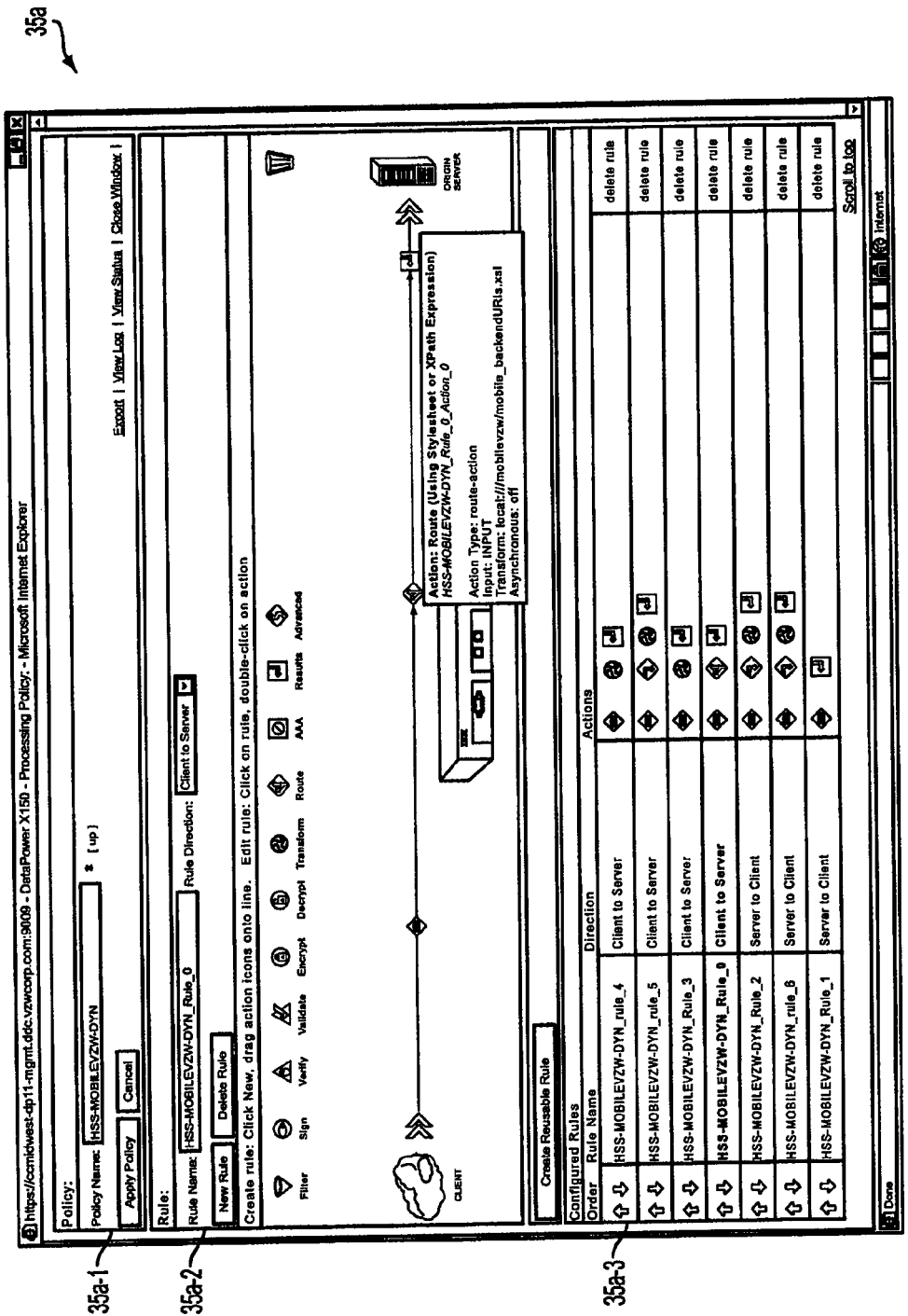
FIG. 3 illustrates a code inside of datapower multi-protocol gateway shown in FIGS. 1 and 2.

FIG. 3 shows the code inside of datapower multi-protocol gateway 35a. The code includes a policy section 35a-1, a rule section 35a-2, and configured rules section 35a-3. The policy section 35a-1 enables defining a particular policy name. In this example, the policy name includes HSS_MOBILEVZW-DYN. The rule section 35a-2 allows defining a name for the rule and creating the rule. In this example, the name for the rule is HSS_MOBILEVZW-DYNRule_0. The configured rule section 35a-3 includes a list of configured rules. Each rule has a match condition that should be met for the rule to be activated. Once activated, the rule may result in performance of one or more actions. The actions may include transformation, routing, encryption, verification, filtering, etc. Each rule can also be designated to handle either incoming request coming to datapower or a reply coming back to datapower. If the rule's direction is set to "Client to Server", then the rule will be considered for incoming request and even then the rule's code will only be run if the match condition is met.

In Step 5, an incoming request is sent to datapower 35 and since this is a request, datapower 35 will look at the match condition for rules that have a direction of "Client to Server". The following Table 1 shows the match condition for these rules. In our example, the incoming request is http://mobile.vzw.com/download/VOD/Calgary/VCastVideos.apk.

TABLE 1

| Rule Name | Match Condition | Match |
|---|---|---|
| HSS-MOBILEVZW-DYN_rule_4 | url contains(/fl/myverizon?platform=) | No |
| HSS-MOBILEVZW-DYN_rule_5 | url contains(/fl/myverizon) | No |
| HSS-MOBILEVZW-DYN_rule_3 | url contain(/myverizon*) | No |
| HSS-MOBILEVZW-DYN_rule_0 | url contain anything | Yes |

The rules are evaluated in the order listed in Table 1. The first 3 rules do not match but 4$^{th}$ rule named HSS-MOBILEVZW-DYN_rule_0 has a match condition to match anything. Therefore, rule HSS-MOBILEVZW-DYN_Rule_0 will be run. That is, the request will be processed by rule HSS-MOBILEVZW-DYN_Rule_0. This rule will read a file called mobile_backendURIs.xsl to decide where to route the request. In this case, it routes the request to the load balancer HSS-MOBILEVZW-LBG 35b (Step 6). The load balancer 35b forwards the request to server 25 (Step 7). The server 25 receives the request for file download request and provides datapower 35 with the requested file.

Below is an example of conversation between datapower 35 and server 25:

1.1. Data Power Request to Server 25:
GET dovvnload/VOD/CalgaryNCastVideos.apk HTTP/1.1
Host: dbawdhssap03.ddc.vzwcorp.com:12111
User-Agent: Mozilla/5.0 (Windows; U; Windows NT 5.1; en-US; rv:1.8.1.15)
Gecko/20080623 Firefox/2.0.0.15

Accept: text/xml,application/xml,application/xhtml+xml,
   text/html;q=0.9, text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
1.2. Server 25 Reply to Datapower 35:
HTTP/1.1 200 OK
Date: Wed, 21 Oct 2009 19:33:56 GMT
Server: IBM_HTTP_Server
Last-Modified: Fri, 4 Sep 2009 14:55:34 GMT
ETag: "1434c-1916640-b132e580"
Accept-Ranges: bytes
Content-Length: 2186345
Keep-Alive: timeout=10, max=100
Connection: Keep-Alive
Content-Type: application/octet-stream
   actual bytes of the file . . . .

Note that server 25 sends the content-length information to datapower 35 (Step 8). However, datapower 35 filters this out before the reply is sent to the multi-protocol gateway 35*a* (Step 9) through filter 35*c*. The datapower multi protocol gateway 35*a* will process the reply. This time datapower 35 will only look at rules that have the direction "Server to Client" since datapower is processing a reply. Table 2 below shows the match condition for the rules designated for the reply. As noted above, the URL is http://mobile.vzw.com/download/VOD/CalgaryNCastVideos.apk.

TABLE 2

| Rule Name | Match Condition | Matches |
| --- | --- | --- |
| HSS-MOBILEVZW-DYN_Rule_2 | url contains(/download/VZAM/*) | No |
| HSS-MOBILEVZW-DYN_Rule_6 | url contains(/download/MOD/Calgary) or url contains(/download/VOD/Calgary) | Yes |
| HSS-MOBILEVZW-DYN_Rule_1 | url contains anything | Not evaluated |

Based on the match conditions, the actions for rule HSS-MOBILEVZW-DYN_Rule_6 will be run. The first action is the fetch command as shown in FIG. 3. This action loads the file CalagaryURIandSizeList.xml into datapower's memory. This XML file contains the file names and file sizes of each video or music file a customer might want to download. The content of the file is shown below:
<?xml version="1.0"?>
<?xml-stylesheet type="text/xsl"
   href="insertContentLengthToResponseHeader.xsl" ?>
<URIandSizeList>
   <URIandSize>
      <URIValue>VCastVideos.apk</URIValue>
      <ContentLength>2186345</ContentLength>
   </URIandSize>
   <URIandSize>
      <URIValue>VCastMusic.apk</URIValue>
      <ContentLength>1755886</ContentLength>
   </URIandSize>
</URIandSizeList>

Figure 4:
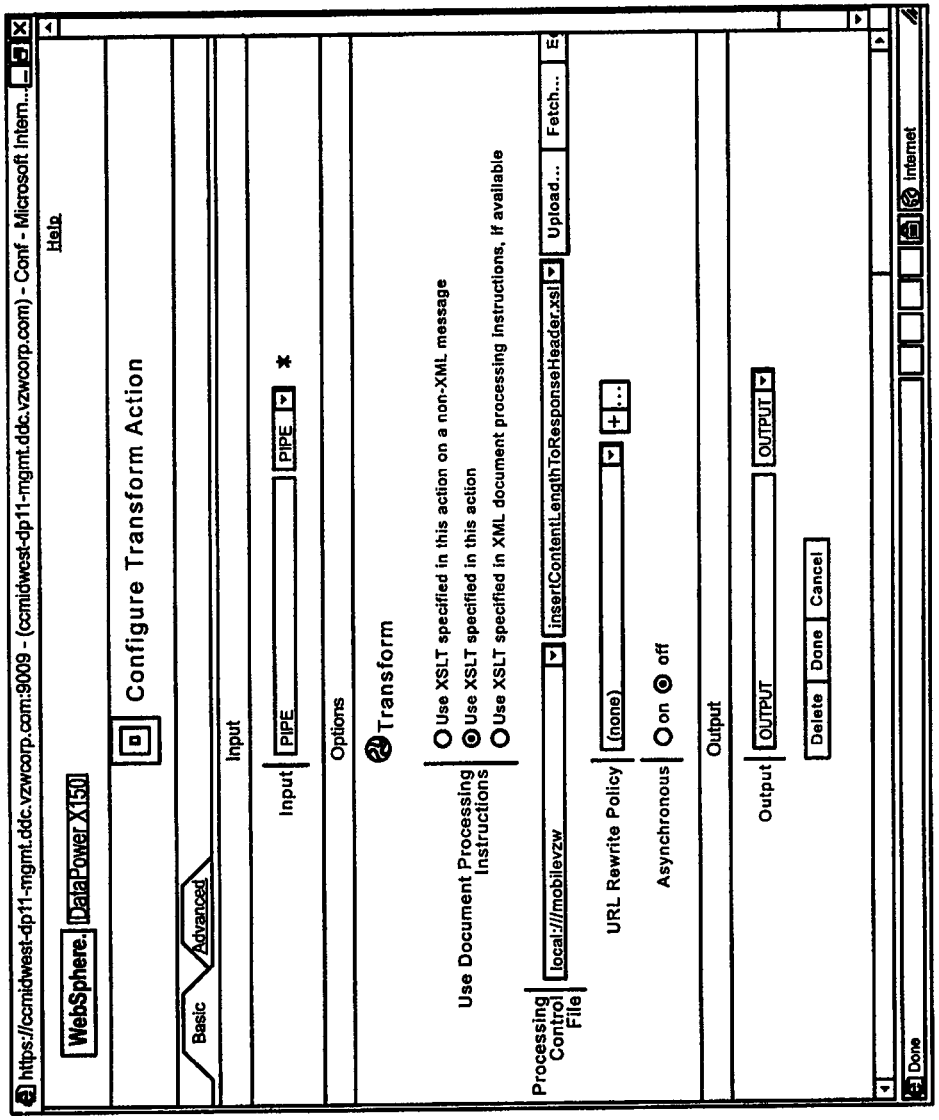
FIG. 4 illustrates a transformation action.

The next action run in this rule is the running of a style sheet transformation file. This is shown as  in FIG. 3. The detail view of the transformation action is shown in FIG. 4.

As shown, the transformation action uses the xslt file called insertContentLengthToResponseHeader.xsl. The content of this file is shown below:
1. <?xml version="1.0"?>
2. <xsl:stylesheet version="1.0" xmlns:xsl="http://www.w3.org/1999/XSL/Transform"
3.    xmlns:dp="http://www.datapower.com/extensions" xmlns:str="http://exslt.org/strings"
4.    xmlns:dpconfig="http://www.datapower.com/param/config" xmlns:func="http://exslt.org/functions"
5. xmlns:dpfunc="http://www.datapower.com/extensions/functions"
6. extension-element-prefixes="func dp str" exclude-result-prefixes="dp dpconfig func dpfunc">
7. <xsl:template match="/">
8. <xsl:variable name="in URI" select="dp:variable('var://service/URI')">
9. <xsl:for-each select="URIandSizeList/URIandSize">
10. <xsl:variable name="urival" select="URIValue"/>
11.    <xsl:variable name="contentLen" select="ContentLength"/>
12. <xsl:if test="contains($in URI,$urival)">
13. <dp:set-response-header name=""Content-Length'" value="$contentLen"/>
14. <xsl:message dp:priority="debug">
15.    <xsl:value-of select="concat ('********AFTER***********URL:' $in URI,'***********************Content Temp Length:', $contentLen)"/>
16. </xsl:message>
17. </xsl:if
18. </xsl:for-each>
19. <xsl:copy-of select="."/>
20. </xsl:template>
21. </xsl:stylesheet>

This style sheet will search the content of the XML file CalagaryURIandSizeList.xml for a match on the URI. Since the incoming URL is http://mobile.vzw.com/download/VOD/CalgaryNCastVideos.apk, it finds a match from these line in the XML file:
   <URIValue>VCastVideos.apk</URIValue>
   <ContentLength>2186345</ContentLength>

Now datapower 35 knows the length of this file. This file length is now inserted into the HTTP header "Content-Length" as shown in line 13 above even though this value was initially filtered out by datapower 35. Now that this field is populated, the response is forwarded to the Midwest CSS 31 (Step 10), which in turn forwards it to Global CSS 27 (Step 11). The Global CSS 27 forwards the reply to wireless network 23 (Step 12), which forwards it to mobile device 13 (Step 13). In this manner, the Motorola™ "Calgary" device will allow the download to take place since this device requires to know the size of the file before download. The following shows the HTTP headers as received by the client:
   HTTP/1.x 200 OK
   X-Backside-Transport: OK OK
   Date: Sun, 7 Mar 2010 14:48:30 GMT
   Server: IBM_HTTP_Server
   Last-Modified: Wed, 17 Feb 2010 21:48:26 GMT
   Etag: "2118b-215c69-cf61de80"
   Content-Type: text/plain
   X-Client-IP: 198.133.105.244
   Content-Length: 2186345
   Proxy-Connection: Keep-Alive
   Connection: Keep-Alive
   Set-Cookie: POPLocation=East; domain-mobile.vzw.com; path=/

The previous section explained how datapower 35 is configured so that the Content-Length would be populated for files going to the Motorola™ "Calgary" device. The same technique is also used for large download files. For large download files, the customer should have progress bars on their client device so that they can see progress being made. The large download files will have "download/VZAM" in the URL. This will cause rule HSS-MOBILEVZW-DYN rule 6 to be activated. This rule will read an XML file called URIandSizeList.xml to get the file sizes for the large download files. It will then insert this length into the HTTP variable "Content-Length" as described earlier. Therefore, the mobile device first receives the content-length information which was previously filtered out by the datapower 35 and can display progress bar as it continuously receives the remaining portions of the requested file from server 25.

The above discussed functions relating to manipulation of HTTP header of content that is being downloaded to include content-length information may be implemented on computers connected for data communication via the components of a packet data network, operating as datapower 35 as shown in FIGS. 1 and 2. Although special purpose devices may be used, such devices also may be implemented using one or more hardware platforms intended to represent a general class of data processing device commonly used to run "server" programming so as to implement the functions relating to manipulation of HTTP header of content that is being downloaded to include content-length information discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for identifying content-length information. The software code is executable by the general-purpose computer that functions as the datapower server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enabling the identification and insertion of content-length information which has been previously removed by datapower into the reply sent from the server in essentially the manner performed in the implementations discussed and illustrated herein.

Figure 5:
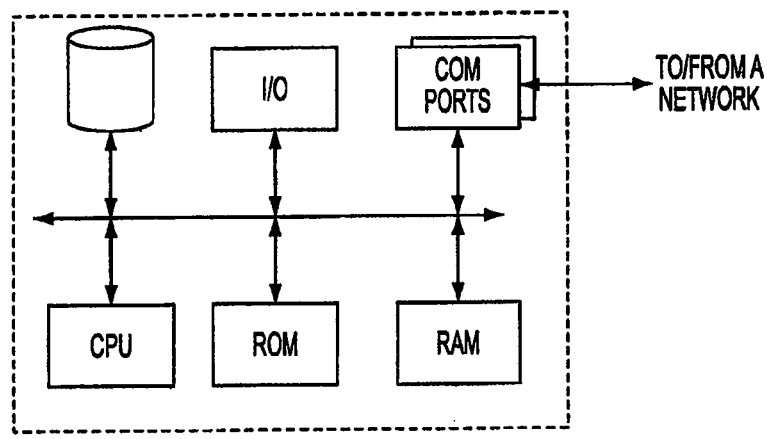
FIG. 5 is a simplified functional block diagram of a computer that may be configured as a host or server, for example, to function as one of the datapowers shown in FIG. 1.
Figure 6:
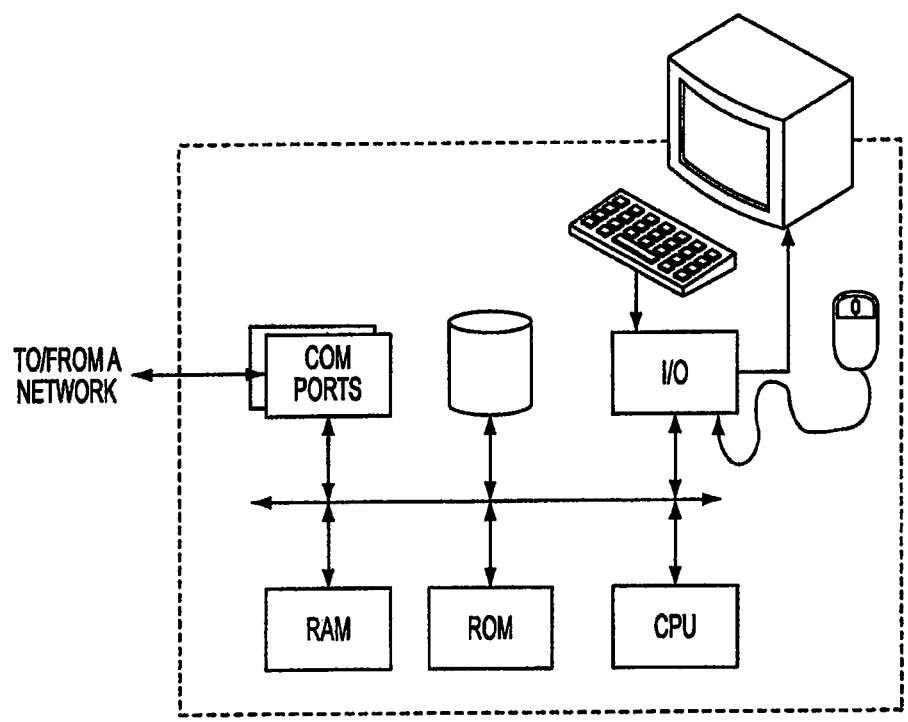
FIG. 6 is a simplified functional block diagram of a personal computer or other work station or terminal device that may be used by a user to access content over the network shown in FIG. 1.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods for enabling manipulation of a HTTP header of content that is being downloaded through a datapower to include content-length information outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile service provider network into the datapower 35. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the functions relating to manipulation of the a HTTP header of content that is being downloaded through a datapower to include content-length information etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, comprising:
   receiving, by a routing server, a request sent from a mobile device via a mobile service provider network, wherein the request is a request for downloading content over a wireless network, wherein the routing server includes an IBM datapower having a load balancer group configured to distribute workload evenly across two or more content servers;
   forwarding the request to the IBM datapower;
   in response to the request, acquiring by the routing server the requested content from a content server;
   upon receipt of the acquired content, removing by the routing server content-length information from a HTTP header of the acquired content;
   creating a file containing file names and content-length information of files accessed by a user of the mobile device over the mobile service provider network for downloading;
   downloading the file to the routing server;
   accessing, by the routing server, the downloaded file containing file names and content-length information of files, wherein the accessed file is different from files of the acquired content;
   identifying, in the accessed file, a file name associated with the content included in the request;
   referencing the identified file name to identify content-length information corresponding to the identified file name associated with the content in the request;
   repopulating the HTTP header of the acquired content with the identified content-length information; and
   sending the content with the repopulated HTTP header containing the identified content-length information, by streaming the content from the content server through the routing server and the mobile service provider network to the mobile device.

2. The method of claim 1, wherein forwarding the request to the IBM datapower includes forwarding the request to the IBM datapower configured for Uniform Resource Indicator ("URI") routing.

3. The method of claim 1, wherein the content server is a server that includes various content for download.

4. The method of claim 1, further comprising:
   creating a file containing file names and file lengths for files accessed by a user of the mobile device over the mobile service provider network for downloading; and
   downloading the file to the routing server.

5. The method of claim 1, wherein the identified content-length information includes a file size associated with the identified file name.

6. The method of claim 1, further comprising:
   applying to the request, at a gateway of the routing server, a rule from a set of rules for handling incoming requests coming to the routing server from the mobile device; and
   applying a reply rule from a set of rules for handling replies coming back to the routing server from the content server in response to the request for content.

7. The method of claim 6, wherein each reply rule includes a match condition that must be met to be activated, the method further comprising steps of:
   upon acquiring the content from the content server, referencing the set of reply rules for handling replies coming back to the routing server from the content server to identify a match; and
   inserting the content-length information into the HTTP header based on the identified rule.

8. The method of claim 1, wherein acquiring and sending the content to the mobile device includes streaming the content from the content server through the routing server to the mobile device.

9. A routing server, comprising:
   at least one processing device;
   an IBM datapower including a load balancer group configured to distribute workload evenly across two or more content servers; and
   at least one memory storing executable instructions for causing the at least one processing device to:
   receive, from a mobile device via a mobile service provider network, a request for downloading content over a wireless network;
   forward the request to the IBM datapower;
   in response to the request, acquire the content from a content server;
   remove content-length information from a HTTP header of the acquired content;
   create a file containing file names and content-length information of files accessed by a user of the mobile device over the mobile service provider network for downloading;
   download the file to the routing server;
   access, in the at least one memory, the downloaded file containing file names and content-length information for files, wherein the accessed file is different from files of the acquired content;
   identifying, in the accessed file, a file name associated with the content included in the request;
   referencing the identified file name to identify content-length information corresponding to the identified file name associated with the content in the request;
   repopulate the HTTP header of the acquired content with the identified content-length information; and
   send, by streaming the content from the content server through the routing server and the mobile device provider network, the acquired content with the repopulated HTTP header containing the identified content-length information to the mobile device.

10. The routing server of claim 9, wherein the content server is a server that includes various content for download.

11. The routing server of claim 9, wherein the at least one memory stores executable instructions for causing the at least one processing device to perform Uniform Resource Indicator ("URI") routing.

12. The routing server of claim 9, wherein the identified content-length information includes a file size associated with the identified file name.

13. The routing server of claim 9, wherein the at least one memory stores a set of rules for handling incoming requests coming to the routing server from the mobile device and a set of rules for handling replies coming back to the mobile device from the routing server.

14. The routing server of claim 13, wherein:
each rule includes a match condition that must be met to be activated; and
the at least one memory stores executable instructions for causing the processing device to:
reference the set of rules for handling replies coming back to the routing server from the content server to identify a match; and
insert the content-length information into the repopulated HTTP header based on the identified rule.

15. The routing server of claim 13, wherein to acquire the content from the content server and to send the content to the mobile device, the at least one memory stores executable instructions for causing the processing device to acquire and send the content in a streaming manner.

\* \* \* \* \*